No. 672,153. P. T. SIEVERT. Patented Apr. 16, 1901.
PROCESS OF MANUFACTURING HOLLOW GLASS ARTICLES.
(Application filed Feb. 6, 1900.)
(No Model.)

Witnesses:-
Edward Vieser
George Barry Jr

Inventor:-
Paul Theodor Sievert
by attorneys
Brown & Seward

UNITED STATES PATENT OFFICE.

PAUL THEODOR SIEVERT, OF DRESDEN, GERMANY.

PROCESS OF MANUFACTURING HOLLOW GLASS ARTICLES.

SPECIFICATION forming part of Letters Patent No. 672,153, dated April 16, 1901.

Original application filed January 31, 1899, Serial No. 704,054. Divided and this application filed February 6, 1900. Serial No. 4,177. (No specimens.)

*To all whom it may concern:*

Be it known that I, PAUL THEODOR SIEVERT, a subject of the King of Saxony, and a resident of Dresden, in the Kingdom of Saxony, in the German Empire, have invented a new and useful Improvement in Processes of Manufacturing Hollow Glass Articles, of which the following is a specification.

The invention which constitutes the present improvement is based upon the process of manufacturing hollow glass articles which is the subject of my United States Patent No. 651,059, dated June 5, 1900.

There are certain hollow glass articles—bottles, for example—which it would be, if not impossible, at least impracticable or very difficult to produce entirely by a single operation of that process, and to provide for the employment of the process in the manufacture of such articles the present improvement consists in first obtaining a bottomless glass body by any means—the said process, for example—and then according to said process spreading out a liquid glass mass into a layer and while said layer remains molten or plastic placing upon it the edges of said bottomless body and blowing up said molten or plastic layer against and within said edges, thereby forming a bottom to said body while the so-formed bottom is united with the body by the heat of the molten or plastic layer.

The improvement is illustrated by the accompanying drawings, which represent apparatus for first manufacturing according to said patented process hollow bodies constituting each the walls and neck of a bottle and afterward manufacturing by the same process the bottoms therefor, the walls being united with the bottoms by the act of manufacturing the latter.

Figure 1:
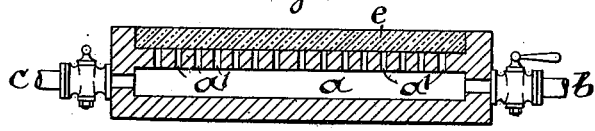
Figure 2:
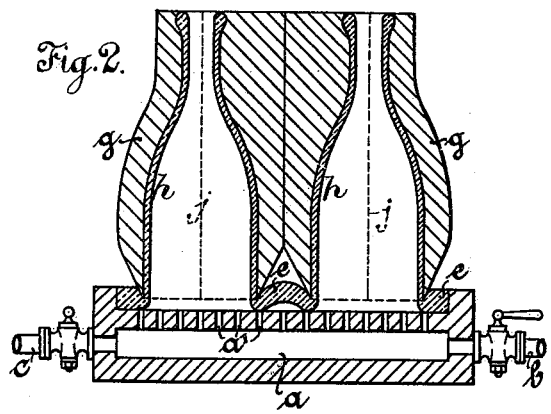
Figures 3, 4:
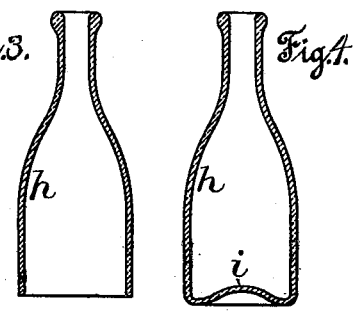
Figure 5:
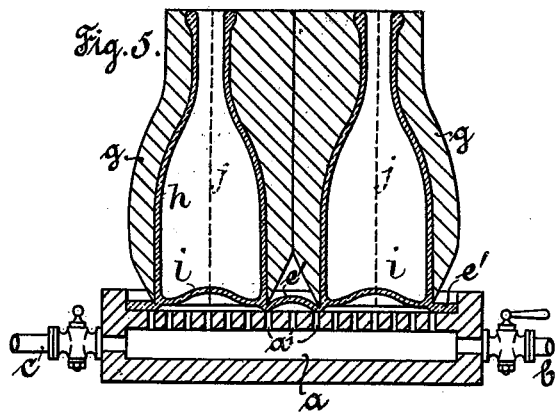

Figure 1 represents a vertical section of a hollow perforated slab or plate upon which the molten glass for performing either of the two operations above mentioned is spread and from which the said glass while plastic is to be blown into shape by the elastic pressure medium; Fig. 2, a vertical section of the said slab having placed upon it molds into which the plastic glass is blown from the slab to form hollow bodies each of which comprises the body and neck of a bottle without the bottom; Fig. 3, a vertical section of the hollow body above mentioned; Fig. 4, a vertical section of the completed bottle; Fig. 5, a vertical section of an apparatus like that shown in Fig. 2, illustrating the manufacture of the bottoms and their attachment to the body portions of the bottles.

Referring first to Fig. 1, $a$ is the hollow slab, table, or plate, in communication with the internal cavity of which are an inlet-pipe $b$ and an outlet-pipe $c$, each provided with a cock or valve for the regulation of the tension of the elastic pressure medium—steam, air, or gas—which is admitted to said cavity and which issues therefrom through the perforations $a'$ in the upper surface of the slab $a$ for the purpose of blowing up the layer $e$, of molten or plastic glass, deposited and evenly spread on said surface, while the said layer is held and confined to the said slab by the sharp edges of the molds $g$, (see Fig. 2,) which are placed on the said layer. These molds have the form of the bodies and necks of bottles, and when the glass of the layer $e$ is blown into them by the elastic pressure medium issuing through the perforations $a'$ of the slab $a$ there is produced in each a bottomless hollow body $h$, having the contour of a bottle such as is shown detached from its mold in Fig. 2. In this operation there will be a blowover above the open top of the mold, and this blowover, which will generally be burst open in the form of a frill, is to be trimmed off.

To prepare for the manufacture of the bottoms $i$ of the bottles and their attachment to the bottomless hollow bodies $h$, the said bodies are removed in the molds from the slab $a$ and the surplus glass of the layer $e$, which surrounds the lower edges of said bodies, is trimmed off by any suitable means known to glass-blowers. The molds $g$ and the hollow bodies $h$ within them are then placed upon a second layer $e'$ of molten glass which has been spread on another perforated slab $a$ like that first described, and the blowing up of said second layer $e'$ by the elastic pressure medium in the manner described with reference to the first one forms the bottoms $i$ of the bottles, which are at the same time welded to or united with the lower edges of the bodies $h$, as shown in Fig. 5, by the heat of the glass of the layer $e'$. The molds with the formed and bottomed bottles are then removed from the slab $a$, and on the surplus glass of the glass layer $e'$ having been trimmed off the bottles are left separated and complete, as shown in Fig. 5.

To insure the perfect union of the bottoms with the bodies of the bottles, the two blowing operations described should be performed without intermediate delay.

It may be hardly necessary to mention that in the manufacture of many articles by this process, such articles, for example, as the bottles represented, the molds $g$ should be of two parts separable on suitable lines, as indicated at $j$, for the removal of the blown articles therefrom.

What I claim as my invention is—

The improvement herein described in process of manufacturing hollow glass articles consisting in first obtaining a bottomless hollow glass body, next spreading out a liquid glass mass into a layer, then while said layer remains molten or plastic placing upon it the edges of said bottomless body, and finally blowing out a portion of said molten or plastic layer against and within said edges and thereby giving form to the said portion while it and the said body are welded together by the heat of said layer.

In testimony that I claim the foregoing as my invention I have signed my name, in presence of two witnesses, this 24th day of January, 1900.

PAUL THEODOR SIEVERT.

Witnesses:
HERNANDO DE SOTO,
PAUL ARRAS.